United States Patent [19]

Wood, Jr.

[11] Patent Number: 4,695,182
[45] Date of Patent: Sep. 22, 1987

[54] BALL JOINT WITH MECHANICAL INTERLOCK

[75] Inventor: Ruey E. Wood, Jr., St. Clair Shores, Mich.

[73] Assignee: TRW Inc., Lyndhurst, Ohio

[21] Appl. No.: 875,673

[22] Filed: Jun. 17, 1986

Related U.S. Application Data

[63] Continuation-in-part of Ser. No. 815,675, Jan. 2, 1986, which is a continuation of Ser. No. 726,135, Apr. 23, 1985, abandoned.

[51] Int. Cl.$^4$ .......................... F16C 11/00; F16D 1/12
[52] U.S. Cl. .................................... 403/140; 403/133
[58] Field of Search ........................ 403/132, 133, 140

[56] References Cited

U.S. PATENT DOCUMENTS

| | | |
|---|---|---|
| 2,305,881 | 12/1942 | Leighton . |
| 2,328,330 | 8/1943 | Edington . |
| 2,553,689 | 5/1951 | Tuck et al. . |
| 2,879,091 | 3/1959 | Baker . |
| 2,954,992 | 10/1960 | Baker . |
| 3,259,963 | 7/1966 | White . |
| 3,999,870 | 12/1976 | Clark et al. . |
| 4,129,394 | 12/1978 | Eichinger et al. . |
| 4,159,186 | 6/1979 | Funcke . |
| 4,235,558 | 11/1980 | Snyder et al. . |

FOREIGN PATENT DOCUMENTS 737811  10/1955  United Kingdom ................ 403/132

*Primary Examiner*—Andrew V. Kundrat
*Attorney, Agent, or Firm*—Tarolli, Sundheim & Covell

[57] ABSTRACT

A ball and socket joint connects load transmitting members for relative pivotal movement. The ball and socket joint includes a socket, a ball stud, and a deformable elastomeric material. The socket connects with one member. The socket has an opening and a surface defining a chamber. The ball stud connects with the other member. The ball stud has a ball portion and a shank portion extending therefrom. The ball portion is disposed in the chamber and the shank portion extends through the opening. The ball portion includes at least one surface defining a volume therein. The deformable elastomeric material is disposed between the socket and the ball portion of the ball stud to resiliently interconnect the ball stud with the socket. The deformable elastomeric material also urges the ball stud to return to an initial position relative to the socket upon relative movement of the ball stud and socket. The elastomeric material has at least one portion which projects into the volume of the ball portion to mechanically interlock the elastomeric layer and the ball stud. The portion projecting into the volume prevents slippage of the elastomeric layer relative to the ball stud.

15 Claims, 13 Drawing Figures

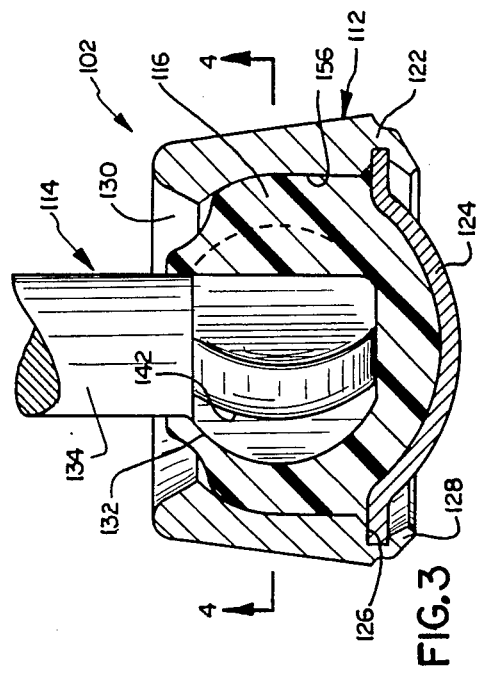
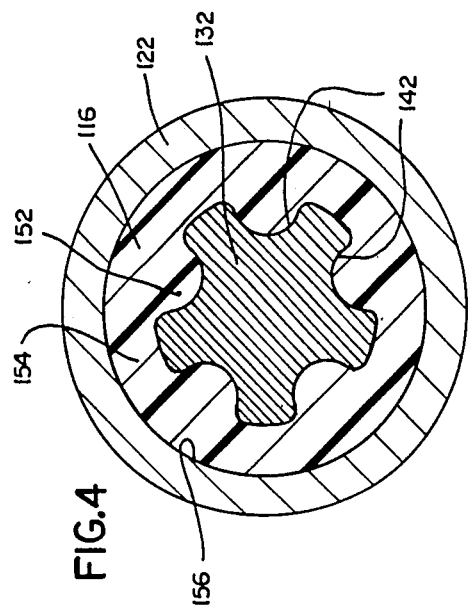
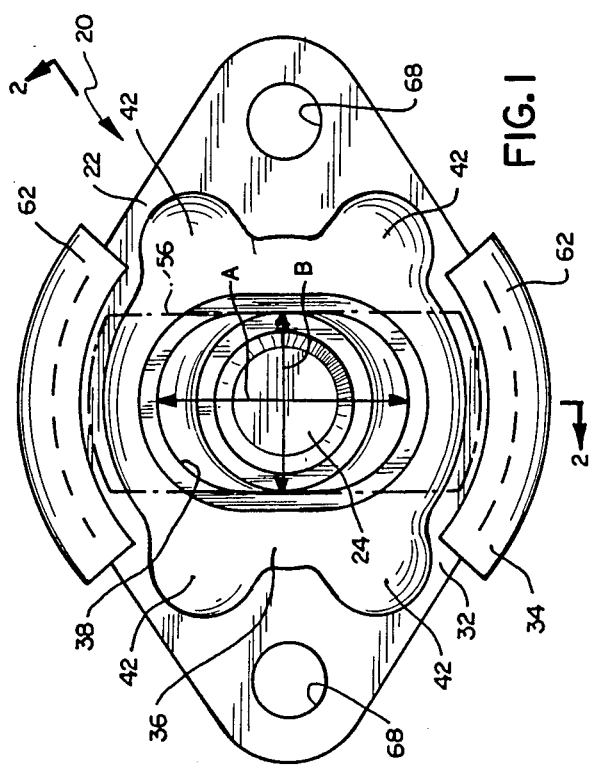
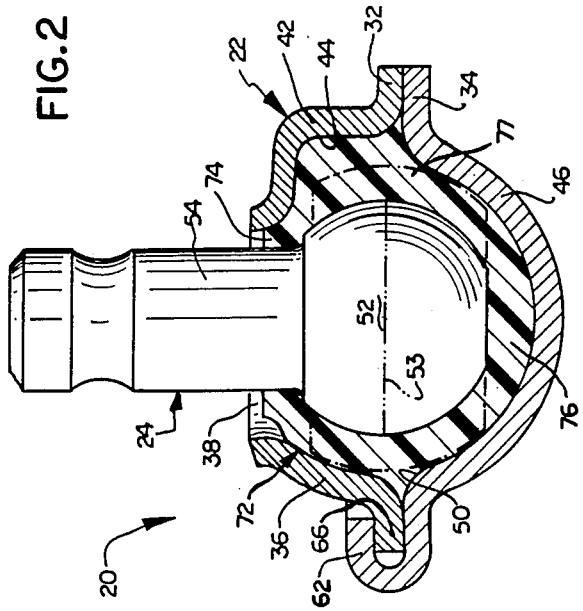

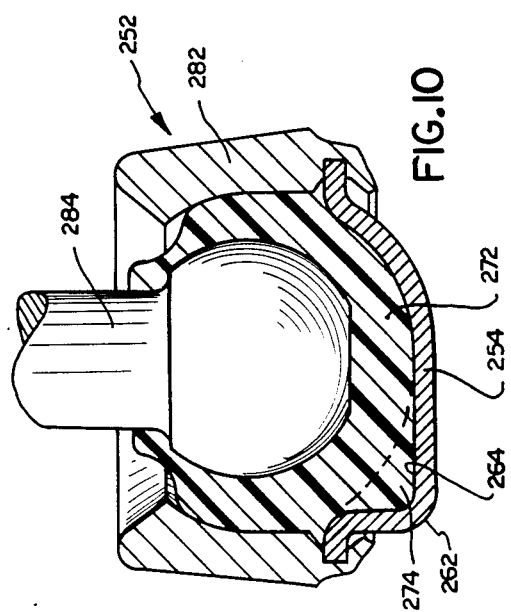
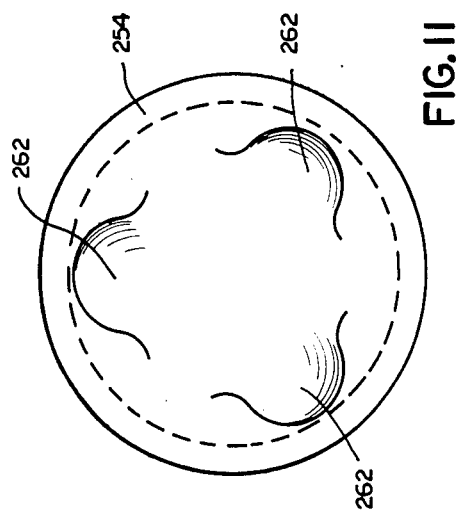
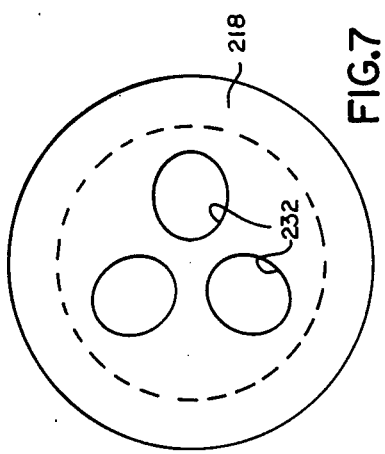
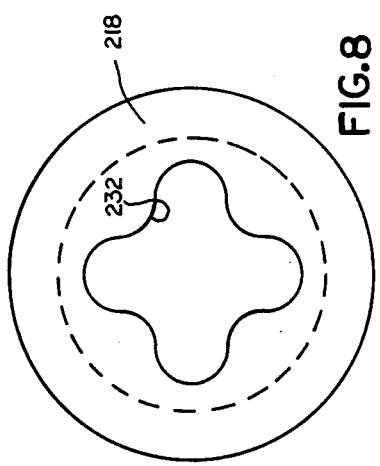
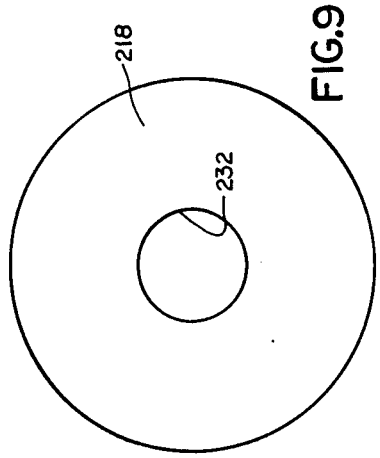
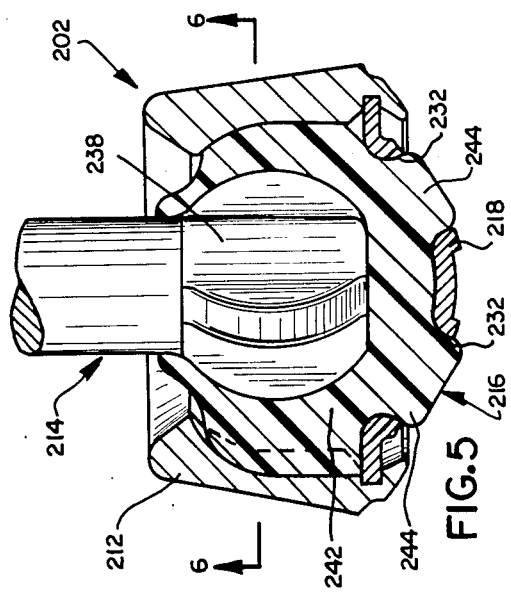
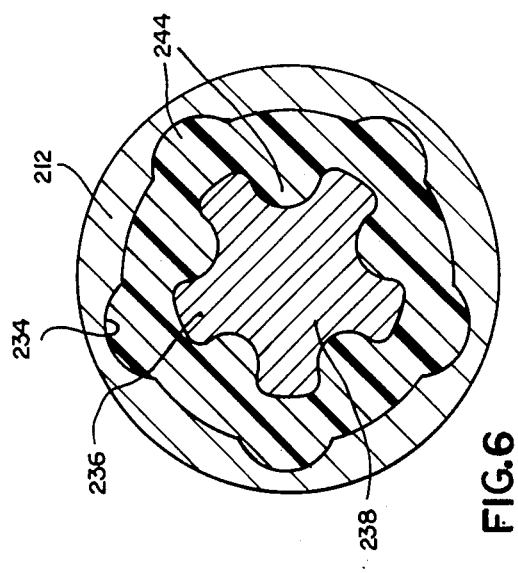

BALL JOINT WITH MECHANICAL INTERLOCK

This application is a continuation-in-part of Application Ser. No. 815,675, filed Jan. 2, 1986 entitled "Joint Assembly," which is assigned to the assignee of the present application, and which is a continuation of Ser. No. 726,135, filed Apr. 23, 1985, now abandoned.

BACKGROUND OF THE INVENTION

The present invention relates to a ball and socket joint. In particular, the present invention relates to a ball and socket joint having elastomeric material disposed between the socket and ball stud.

Ball and socket joints are known and are commonly used between load transmitting members which move relative to each other. Typically, ball and socket joints include a ball and stud for connection with one of the load transmitting members and a socket for connection with the other load transmitting member. The ball stud includes a ball portion which is disposed in a chamber defined by the socket. A bearing arrangement is provided between the ball portion of the ball stud and the socket to transmit forces between the ball stud and the socket and to permit relative movement therebetween.

One type of known bearing arrangement is disclosed in U.S. Pat. Nos. 2,979,353; 3,843,272; and 4,235,558. These patents disclose ball joints having elastomeric bearing material located between the ball portion of the ball stud and the socket. The elastomeric material is interposed between the ball stud and the socket and resiliently interconnects the ball stud and the socket. The elastomeric material deforms resiliently during relative movement between the ball and stud and the socket. Because the elastomeric material is resilient, it tends to urge the ball stud and socket to an original relative position once the ball stud and socket are moved relatively from the original relative position.

In these structures, the elastomeric material is bonded by a suitable adhesive to the ball portion of the ball stud to prevent slippage of the elastomeric material relative to the ball portion of the ball stud. Also, to prevent slippage of the elastomeric material relative to the socket the elastomeric material has been bonded to the socket. Such a technique is disclosed in U.S. Pat. No. 3,843,272. The bonding process, however is relatively expensive and requires frequent monitoring to assure a quality bond.

Another technique to prevent slippage of the elastomeric material relative to the socket is to substantially compress or preload the elastomeric material between the ball portion and the socket. This causes the elastomeric material to be wedged tightly against the surface of the socket. This technique has resulted in a problem that is referred to as "excess torque hysteresis." Specifically, the compression creates significant internal stresses in the elastomeric material. When the ball stud and socket are relatively moved, the internal stresses are changed. When the forces causing the relative movement of the ball stud and socket are removed, the elastomeric material will not return to its original position because the internal stresses are not the same as they were at assembly. Therefore, the ball stud and socket will not necessarily return to their original relative positions.

SUMMARY OF THE PRESENT INVENTION

The present invention is directed to a ball and socket joint having elastomeric material disposed between the socket and ball stud. In accordance with the present invention, bonding of the elastomeric material to the ball portion of the ball stud and to the socket is eliminated. Thus, the present invention eliminates the problems associated with bonding. Furthermore, the elastomeric material is not compressed between the ball portion and the socket during assembly. Thus, the present invention minimizes the "excess torque hysteresis" problem associated with preloading of the elastomeric material.

The ball and socket joint of the present invention has a mechanical interlock between the ball portion of the ball stud and the elastomeric material. Specifically, the ball portion has circumferentially spaced recess. The elastomeric material encapsulates the ball portion and projects into and fills the recesses. This mechanically interlocks the ball stud with the elastomeric material to prevent slippage of the elastomeric material relative to the ball stud.

Another feature of the present invention involves mechanically interlocking the elastomeric material with the socket. The ball stud projects through an elongated opening in the socket. The ball stud is constrained to oscillate along the axis of the opening and rotate about its own axis. The elastomeric material includes a band portion of a relatively uniform thickness disposed between the socket and ball stud. Volumes defined by the socket receive portions of the elastomeric material which are located circumferentially relative to the band portion to prevent slippage of the elastomeric material relative to the socket.

The elastomeric material may be constructed of portions having different durometers. A resiliently deformable layer having a relatively low durometer may be disposed between the socket and the ball for resiliently interconnecting the ball stud and the socket. Portions of a relatively higher durometer can project from the resiliently deformable layer into mechanical interlocking engagement with the ball stud and/or socket.

BRIEF DESCRIPTION OF THE DRAWINGS

The foregoing and other advantages and features of the present invention will become apparent to one skilled in the art to which the present invention relates upon a reading of the following description made with reference to the accompanying drawings, wherein:

FIG. 1 is a top view of a ball joint embodying a feature the present invention;

FIG. 2 is a cross sectional view taken approximately along line 2—2 of FIG. 1;

FIG. 3 is a cross sectional side view of another ball joint embodying another feature the present invention;

FIG. 4 is a cross sectional view taken approximately along the line 4—4 of FIG. 3;

FIG. 5 is a cross sectional view of still another ball joint embodying a further feature of the present invention;

FIG. 6 is a cross sectional view taken approximately along line 6—6 of FIG. 5;

FIGS. 7-9 are alternative bottom views of the ball joint of FIG. 5;

FIG. 10 is a cross sectional view of another ball joint embodying still another feature of the present invention;

FIG. 11 is a bottom view of the ball joint of FIG. 10;

DESCRIPTION OF THE PRESENT INVENTION

Figure 12:
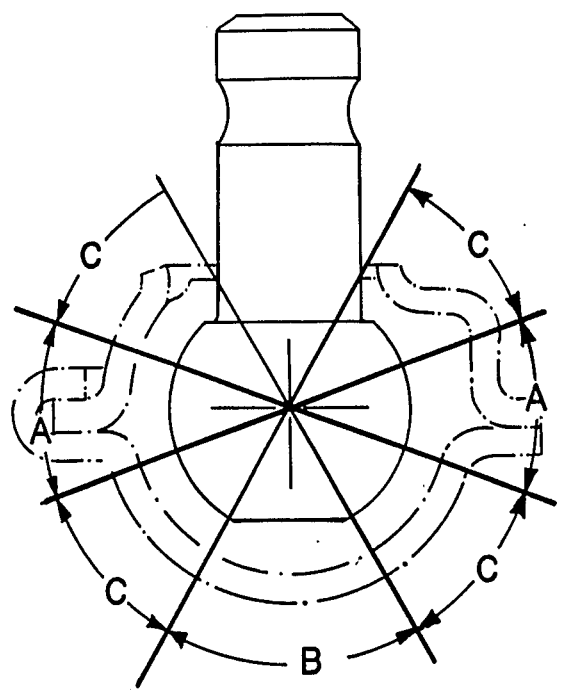
FIG. 12 is a schematic view of the various loading regions of a ball joint such as the ball joint of FIGS. 1 and 2.

The present invention is directed to a ball and socket joint having elastomeric material interposed between the socket and ball stud. The present invention can be embodied in various constructions but is illustrated as a ball joint 20 (FIG. 1) which connects load transmitting members for relative movement. A typical use for the ball joint 20 is in various chassis connections of an automobile.

The ball joint 20 includes a socket 22 and a ball stud 24. The socket 22 is for connection with one of the load transmitting members. The ball stud 24 is for connection with the other of the load transmitting members.

The socket 22 (FIG. 2) includes an upper part 32 and a lower part 34. The upper part 32 and the lower part 34 are stamped from sheet metal. The upper part 32 has a spherical portion 36 and an opening 38. The upper part 32 also has four portions 42 which extend radially outward from the spherical portion 36, as viewed in FIG. 1, to define interior volumes 44 (FIG. 2). The portions 42 also extend upwardly, as viewed in FIG. 2, from the generally spherical portion 36. The lower part 34 also includes a spherical portion 46. The spherical portion 36 and volumes 44 of the upper part 32 combined with the spherical portion 46 of the lower part define a chamber 50.

The ball stud 24 is forged from steel and includes a ball portion 52 and a shank portion 54 extending therefrom. The ball portion 52 is disposed within the chamber 50. The ball portion 52 has an equator 53 extending around the ball portion in a plane which is perpendicular to the longitudinal axis of the ball stud 24. The shank portion 54 extends through the opening 38.

The opening 38 (FIG. 1) is elongated. Specifically, the opening 38 has a dimension A which is larger than dimension B. The dimension B of the opening 38 is slightly larger than the diameter of the shank portion 54. The dimension A is substantially greater than the diameter of the shank portion 54 of the ball stud. Thus, the shank portion 54 is constrained to move in a direction along dimension A. When the shank portion 54 oscillates in a path 56 along dimension A, the ball portion 52 pivots relative to the socket 22.

The upper part 32 and lower part 34 are connected by crimped-over edges. Specifically, the lower part 34 includes the portions 62 (FIG. 2) which are crimped over a flange 66 of the upper part 32. The socket 22 also includes openings 68 (FIG. 1) which receive bolts or rivets for connecting the sockets with the chassis of the vehicle.

An elastomeric material 72 (FIG. 2) is interposed between the socket 22 and the ball stud 24. The specific composition of the elastomeric material 72 is known and may be the same composition as the elastomeric materials disclosed in the aforementioned U.S. patents. In general, as used herein, "elastomer" or "elastomeric" means any rubber or rubber-like material. It is intended to include synthetic rubber, natural rubber, neoprene, butyl rubber, etc.

During manufacture, the ball stud 24 and the socket 22 are held in appropriate tooling in a desired relationship. The elastomeric material 72 is then injected, in a liquid state, into the chamber 50. The elastomeric material 72 encapsulates the ball portion 52. The elastomeric material 72 includes a resilient layer 76 and portions 78 projecting into the volumes 44. The elastomeric material 72 also has a portion 74 which projects for a distance along the shank portion 54 to act as a seal.

The resilient layer 76 of the elastomeric material 72 resiliently interconnects the socket 22 with the ball stud 24. When the ball stud 24 oscillates relative to the socket along the dimension A (FIG. 1) of the opening 38, a portion of the resilient layer 76 (FIG. 2) is compressed between the ball stud 24 and the socket 22. When the resilient layer 76 is compressed, internal forces are created which act against the ball stud 24 tending to urge the ball stud 24 to an initial position relative to the socket 22.

The resilient layer 76 has a band portion 77 of a relatively uniform thickness surrounding a relatively large surface area of the ball portion 52. The band portion 77 is loaded during osciallation of the ball stud 24 and reacts uniformly to loading in all directions due to its relatively uniform thickness. The band portion 77 encircles the equator 53 and extends longitudinally for a distance in opposite directions along the ball portion 52 from the equator. The portion 74 of the resilient layer 76 near the opening 38 and the portion opposite the opening 38 are of a different thickness than the band portion 77.

The projecting portions 78 (FIG. 13) are located circumferentially relative to the band portion 77 and extend into volumes 44. This mechanically interlocks the elastomeric material 72 with the socket 22 to prevent slippage of the elastomeric material relative to the socket. Preventing slippage of the elastomeric material 72 relative to the socket 22 assures that the resilient layer 76 exerts approximately the same force around the ball stud 24 urging it to an initial position in all directions of relative movement between the socket 22 and ball stud 24. Since loading of the resilient layer 76 occurs mainly in the direction along dimension A (FIG. 1) of the elongated slot 38, the volumes 44 are located in areas that are subjected to minimal loads. The projecting portions 42 are spaced transversely outside of the path 56 in which the shank portion 54 oscillates. This tends to prevent the projecting portions 78 from being compressed upon oscillation of the shank portion.

The ball joint illustrated in FIG. 12 has circumferential regions A, B, and C. Vertical loading of the ball joint occurs mostly in region B. Transverse loading of the ball joint occurs mostly in regions A. Minimal loading occurs in regions C. Therefore, the volumes 44 which contain the projecting portions 78 are positioned in the regions C.

The projecting portions 78 (FIG. 13) may be made from material having a relatively higher durometer than the resilient layer 76. The projecting portions 78 thus better resist compression and further avoid the "excess torque hysteresis" problem. The resilient layer 76 (FIG. 13) and the projecting portions 78 are preferably molded from different elastomeric compositions. The materials are permitted to blead together, or intermix, during manufacture which creates a transitional zone 82 between the materials. This transition zone 82 is relatively thin, but tends to prevent a build up of shearing stresses that would occur at a discrete parting line if the materials did not bleed together.

Figure 13:
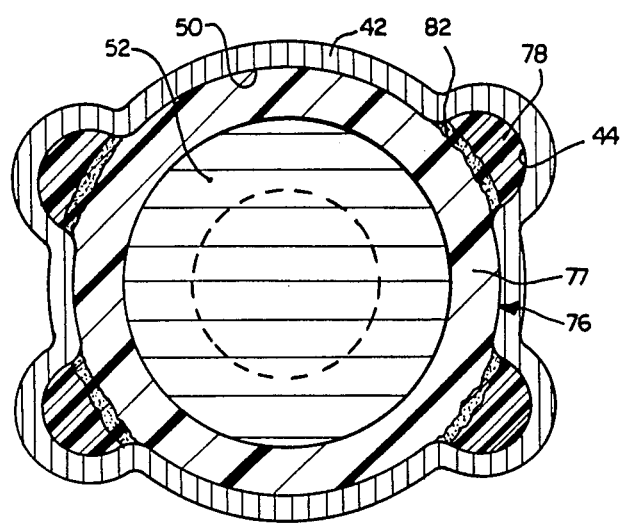
FIG. 13 is an enlarged cross sectional view of a ball joint embodying another feature of the present invention.

The higher durometer material forming the projecting portions 78 provides a good mechanical interlock because it resists compression during operation of the ball joint 20. The locations of the projecting portions 78 in FIG. 13 are the same as the locations of the projecting portions 78 in FIGS. 1 and 2. Therefore, the relative hardness of the projecting portions 78 resist compression during operation of the ball joint 20 and the location subjects the projecting portions to a minimal loading.

The ball joint 102 shown in FIG. 3 typically is used to connect members of a vehicle steering linkage for relative movement. The ball joint 102 includes a socket 112, a ball stud 114 and an elastomeric material 116 interposed therebetween.

The socket 112 includes a housing 122 and a cover 124. The cover 124 abuttingly engages a shoulder 126 located annularly in the socket housing 122. An edge portion 128 of the socket housing 122 is rolled over a portion of the cover 124 to secure the cover in engagement with the socket housing, as is known. The housing 122 has a circular opening 130 disposed opposite the cover 124. The housing 122 and cover 124 define a chamber 156.

The ball stud 114 includes a ball portion 132 and a shank portion 134. The ball portion 132 (FIG. 4) has a plurality of recesses 142 circumferentially spaced in the ball portion 132. The ball portion 132 is disposed in the chamber 156 for pivotal movement relative to the socket 112. The shank portion 134 extends through the opening 130.

Portions 152 of the elastomeric material 116 extend into the plurality of recesses 142 to mechanically interlock the elastomeric material to the ball stud 114. The mechanical interlock between the elastomeric material 116 and the ball portion 132 of the ball stud 114 prevents the elastomeric material from slipping relative to the ball stud. The elastomeric material 116 includes a relatively resilient layer 154 which engages a chamber 156 defined by the socket housing 122. The resilient layer 154 resiliently interconnects the ball stud 114 with the socket 122. The portions 152 of the elastomeric material which project into the recesses 142 may be of a material having a higher durometer than the resilient layer 154, and thus would be similar to the projecting portions 78 described above.

The ball joint 202 illustrated in FIG. 5 includes a housing 212, a ball stud 214, elastomeric material 216 and a cover 218. The ball joint 202 includes a mechanical interlock of the elastomeric material 216 to the ball stud 214, as illustrated in FIG. 6, similar to that of the ball joint 102. The ball joint 202 further includes a mechanical interlock between the elastomeric material 216 and the socket housing 212 and between the elastomeric material and the cover 218.

The cover includes openings 232. FIGS. 7-9 illustrate non-exclusive, alternate configurations of the opening or openings 232 in the cover 218. A portion 244 of the elastomeric material 216 (FIG. 5) extends through each of the openings 232 to mechanically interlock the elastomeric layer to the cover 218. The mechanical interlock prevents the elastomeric layer from slipping relative to the cover 218.

The socket housing 212 includes a plurality of volumes 234 (FIG. 6) arranged about the inner circumference of the chamber defined by the socket housing. The volumes 234 receive a portion of the elastomeric material 216 therein to mechanically interlock the elastomeric material with the socker 212. The mechanical interlock prevents the elastomeric material 216 from slipping relative to the socket 212. The volumes 234 are radially aligned in the socket adjacent to a respective projecting portion 236 extending from the ball stud 214.

Portions 244 of the elastomeric material which extend into the openings 232 and volumes 234 may be made of a material with a relatively higher durometer than the resilient layer 242. The relative hardness of the portions 244 prevent preloading or compression during operation or assembly of the ball joint 202. Thus, problems of bonding the elastomeric material to the socket and the "excess torque hysteresis" problem are avoided by using the mechanical features.

FIGS. 10 and 11 illustrate another embodiment of the present invention. The ball joint 252 includes another mechanical interlock feature in the cover 254. The cover 254 includes a plurality of portions 262 which define volumes 264 in the cover. The elastomeric material 272 has portions 274 which extend into the volumes 264 in order to mechanically interlock the elastomeric material with the cover. The portions 274 of the elastomeric material extending into the volumes 262 may be made of a material having a higher durometer than the resilient layer of elastomeric material interposed between the socket 282 and the ball stud 284, as described above for ball joint 202.

In summary, an improved ball joint is provided in several embodiments. In one embodiment, the ball joint 202 (FIG. 5) includes interlock means comprising the elastomeric material 216 mechanically interlocking with the socket housing 212, the ball stud 214, and the cover 218. The elastomeric material 216 includes a resilient layer 242 which resiliently interconnects the socket housing 212 and ball stud 214. The elastomeric material 216 also includes portions 244 which project into surfaces defining recesses in the ball stud 214, socket housing 212 (FIG. 6) and openings 232 (FIG. 5). The projecting portions 244 may be made of a material having a higher durometer than the resilient layer 242 to resist compression. The projecting portions 244 mechanically interlock the elastomeric material 216 to prevent slippage of the elastomeric material relative to the socket housing 212, ball stud 214 and cover 218. It will be obvious to one skilled in the art that any combination of the mechanical interlocks of the above-described embodiments can, with or without the higher durometer material, be used without detracting from the spirit of the present invention.

From the above description of a preferred embodiment of my invention, those skilled in the art will perceive improvements, changes and modifications and such improvements, changes and modifications within the skill of the art are intended to be included herein and covered by the spirit and scope of the hereinafter appended claims.

Having described at least one preferred embodiment, I claim:

1. A ball and socket joint for connecting load transmitting members for relative pivotal movement, said ball and socket joint comprising:

a socket for connection with one member, said socket having a surface defining a chamber and an elongate opening;

a ball stud for connection with the other member, said ball stud having a ball portion and a shank portion extending therefrom, said ball portion disposed in said chamber and said shank portion extending through said elongate opening, said shank portion being movable in a path along the longitudinal axis of the elongate opening in said socket;

a resiliently deformable elastomeric layer bonded to said ball portion and resiliently interconnecting said ball stud with said socket for urging said ball stud to an initital position relative to said socket;

said elastomeric layer having portions which project into volumes defined by said socket to mechanically interlock said elastomeric layer and said socket and to prevent slipping of said elastomeric layer relative to said socket; and said volumes defined by said socket comprising only volumes transversely spaced from the path of movement of said shank along the longitudinal axis.

2. A ball and socket joint as set forth in claim 1 wherein said portions of said elastomeric layer which extend into volumes defined by said socket are of a higher durometer than the remainder of said elastomeric material.

3. A ball and socket joint comprising:

a socket member having a surface defining a chamber and an opening communicating with the chamber;

a ball stud member having a ball portion and a shank portion extending therefrom, said ball portion being disposed in said chamber and said shank portion extending through said opening;

an elastomeric material having a resilient portion disposed between said socket member and said ball portion for resiliently interconnecting said ball stud member and said socket member;

interlock means on one of said members for receiving another portion of said elastomeric material therein to mechanically interlock said elastomeric material with said one member; and said portion of said elastomeric material received in said interlock means being of a higher durometer than said resilient portion.

4. A ball and socket joint as set forth in claim 3 wherein said interlock means comprises recesses in said socket member defined by surfaces of said socket.

5. A ball and socket joint as set forth in claim 3 wherein said interlock means comprises recesses in said ball portion defined by surfaces of said ball portion.

6. A ball and socket joint as set forth in claim 3 wherein said less resilient portion of said elastomeric material and said remainder of said elastomeric material are joined in a transition zone having said resilient portion and said portion of a higher durometer intermixed.

7. A ball and socket joint for connecting load transmitting members for relative pivotal movement, said ball and socket joint comprising:

a socket for connection with one member, said socket having a surface defining a chamber and an opening;

ball stud for connection with the other member, said ball stud having a ball portion and a shank portion extending therefrom, said ball portion disposed in said chamber and said shank portion extending through said opening, said ball portion having an equator extending therearound in a plane perpendicular to the longitudinal axis of said ball stud;

a resiliently deformable elastomeric material having a band portion of relatively uniform thickness extending longitudinally for a length along said ball portion in opposite directions from the plane of the equator and disposed between said socket and said ball portion for resiliently interconnecting said ball stud with said socket for urging said ball stud to an initial position relative to said socket; and interlock means for receiving at least one portion of said elastomeric material located circumferentially away from said band portion and projecting radially beyond said band for mechanically interlocking said elastomeric material with said socket to prevent slippage of said elastomeric material relative to said socket.

8. A ball and socket joint for connecting load transmitting members for relative pivotal movement, said ball and socket joint comprising:

a socket for connection with one member, said socket having a surface defining a chamber and an opening;

a ball stud for connection with the other member, said ball stud having a ball portion and a shank portion extending therefrom, said ball portion disposed in said chamber and said shank portion extending through the opening for pivotal movement, said ball portion including at least one surface defining a recess therein;

a resiliently deformable elastomeric material disposed between said socket and said ball portion of said ball stud resiliently interconnecting said ball stud with said socket for urging said ball stud to an initial position relative to said socket;

said ball stud having a plurality of recesses circumferentailly spaced around said ball stud into which portions of said elastomeric material project to mechanically interlock said elastomeric material with said ball stud;

said elastomeric material having other portions projecting into volumes defined by said chamber in said socket to mechanically interlock said elastomeric material with said socket and to prevent slippage of said elastomeric material relative to said socket; and said portions of said elastomeric material which project into said recesses in said ball portion and said volumes in said socket being of a higher durometer than the remainder of said elastomeric material.

9. A ball and socket joint for connecting load transmitting members for relative pivotal movement, said ball and said socket joint comprising:

a socket for connection with one member, said socket having a surface defining a chamber and an opening;

a ball stud for connection with the other member, said ball stud having a ball portion and a shank portion extending therefrom, said ball portion disposed in said chamber and said shank portion extending through said opening;

a resiliently deformable elastomeric layer diposed between said socket and said ball portion for resiliently interconnecting said ball stud with said socket for urging said ball stud to an initial position relative to said socket;

a cover connected with said socket;

said cover including interlock means for receiving a portion of said elastomeric layer to mechanically interlock said elastomeric layer with said cover;

said interlock means comprising surfaces of said cover defining an opening into which said elastomeric layer projects; and said surfaces in said cover defining an X-shaped opening.

10. A ball and socket joint for connecting load transmitting members for relative pivotal movement, said ball and socket joint comprising:
a socket for connection with one member, said socket having a surface defining a chamber and an opening;
a ball stud for connection with the other member, said ball stud having a ball portion and a shank portion extending therefrom, said ball portion disposed in said chamber and said shank portion extending through said opening;
a resiliently deformable elastomeric layer disposed between said socket and said ball portion for resiliently interconnecting said ball stud with said socket for urging said ball stud to an initial position relative to said socket;
a cover connected with said socket;
said cover including interlock means for receiving a portion of said elastomeric layer to mechanically interlock said elastomeric layer with said cover;
said elastomeric layer having portions which project into volume defined by said chamber and volumes defined by said ball portion to mechanically interlock said elastomeric layer with said socket and said ball stud and to prevent movement of said elastomeric layer relative to said socket and said ball stud;
said portions of said elastomeric layer which project into said volumes being of a higher durometer than the remainder of said elastomeric layer.

11. A ball and socket joint for connecting load transmitting members for relative pivotal movement, said ball and socket joint comprising:
a socket for connection with one member, said socket having a surface defining a chamber and an opening;
a ball stud for connection with the other member, said ball stud having a ball portion and a shank portion extending therefrom, said ball portion disposed in said chamber and said shank portion extending through said opening;
a resiliently deformable elastomeric layer disposed between said socket and said ball portion for resiliently interconnecting said ball stud with said socket for urging said ball stud to an initial position relative to said socket;
a cover connected with said socket;
said cover including interlock means for receiving a portion of said elastomeric layer to mechanically interlock said elastomeric layer with said cover;
said portion of said elastomeric layer received in said interlock means being of a higher durometer than the remainder of said elastomeric layer.

12. A ball and socket joint for connecting load transmitting members for relative pivotal movement, said ball and socket joint comprising:
a socket for connection with one member, said socket having a surface defining a chamber and an opening;
a ball stud for connection with the other member, said ball stud having a ball portion and a shank portion extending therefrom, said ball portion being disposed in said chamber and said shank portion extending through said opening, said ball portion having an equator extending therearound in a plane perpendicular to the longitudinal axis of said ball stud;
a resiliently deformable elastomeric material having a band portion of relatively uniform thickness extending longitudinally for a length along said ball portion in opposite directions from the plane of the equator and disposed between said socket and said ball portion for resiliently interconnecting said ball stud with said socket for urging said ball stud to an initial position relative to said socket;
interlock means for receiving at least one portion of said elastomeric material located circumferentially away from said band portion for mechanically interlocking said elastomeric material with said socket to prevent slippage of said elastomeric material relative to said socket; and
said portion of said elastomeric material received in said interlock means being of a higher durometer than the remainder of said elastomeric material.

13. A ball and socket joint for connecting load transmitting members for relative pivotal movement, said ball and socket joint comprising:
a socket connection with one member, said socket having a surface defining a chamber and an opening;
a ball stud for connection with the other member, said ball stud having a ball portion and a shank portion extending therefrom, said ball portion being disposed in said chamber and said shank portion extending through the opening for movement relative thereto, said ball portion including surfaces defining spaced recesses therein;
a resiliently deformable elastomeric material disposed between said socket and said ball portion of said ball stud;
means for attaching said elastomeric material to said socket to resiliently interconnect said ball stud with said socket for urging said ball stud to an initial position relative to said socket upon relative movement therebetween; and
said elastomeric material having spaced portions which project into said recesses of said ball portion to mechanically interlock said elastomeric material with said ball stud, said portions of said elastomeric material in said recesses being conpressed upon relative rotational movement between said ball stud and said socket while other portions of said elastomeric material are tensioned.

14. A ball and socket joint as set forth in claim 13 wherein said means for attaching said elastomeric material to said socket comprises other portions of said elastomeric material which project into volumes defined by said chamber in said socket to mechanically interlock said elastomeric material with said socket to prevent slippage of said elastomeric material relative to said socket.

15. A ball and socket joint as set forth in claim 14 wherein said volumes are located in regions of minimal loading of said elastomeric material.

* * * * *